No. 828,575. PATENTED AUG. 14, 1906.
M. SCHILLING.
ROTARY HOE.
APPLICATION FILED JAN. 10, 1906
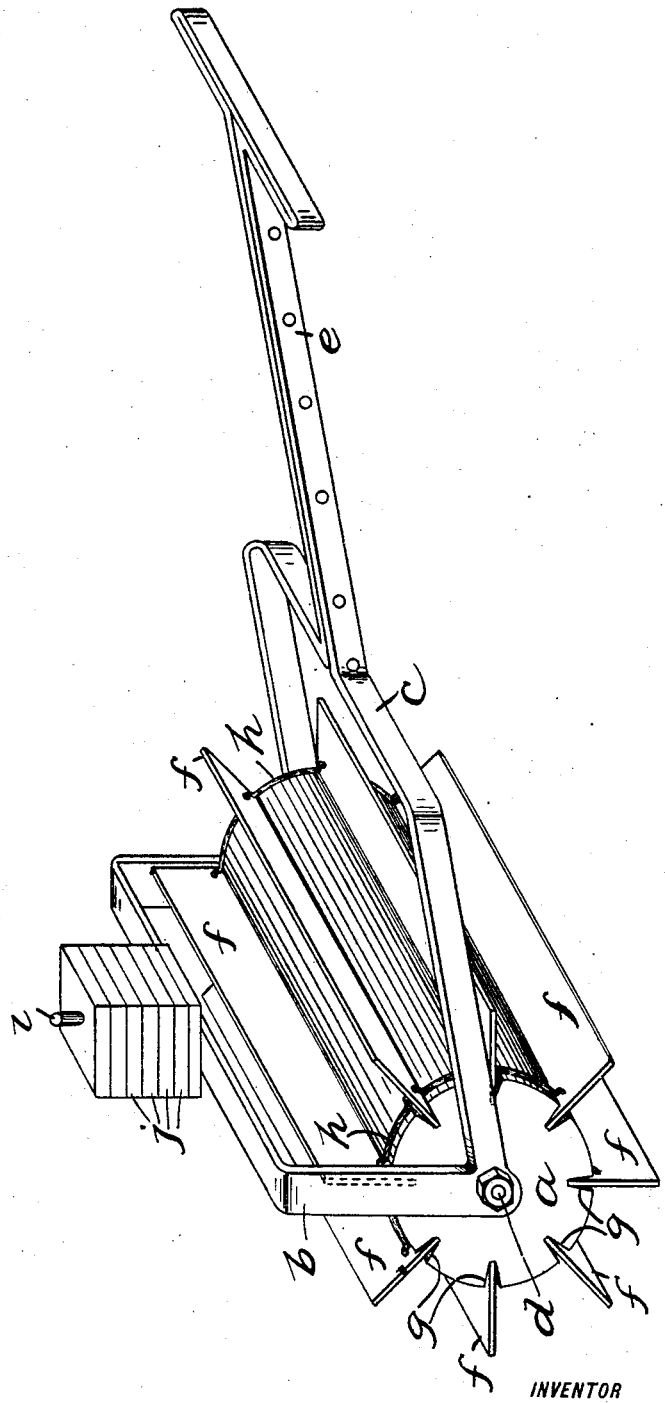
WITNESSES
J. C. Larsen
F. A. Stewart
INVENTOR
Michael Schilling
BY Edgar Tate & Co
ATTORNEYS

UNITED STATES PATENT OFFICE.

MICHAEL SCHILLING, OF CENTRAL PARK, NEW YORK.

ROTARY HOE.

No. 828,575.  Specification of Letters Patent.  Patented Aug. 14, 1906.

Application filed January 10, 1906. Serial No. 295,341.

*To all whom it may concern:*

Be it known that I, MICHAEL SCHILLING, a citizen of the United States, residing at Central Park, Long Island, in the county of Nassau and State of New York, have invented certain new and useful Improvements in Rotary Hoes, of which the following is a specification, such as will enable those skilled in the art to which it appertains to make and use the same.

This invention relates to agricultural implements; and the object thereof is to provide an improved device of this class which is designed to be used in place of a hoe for cutting up and stirring up ground and the various other purposes for which devices of this class are employed.

The invention is fully disclosed in the following specification, of which the accompanying drawing forms a part, in which the separate parts of my improvement are designated by suitable reference characters, said drawing being a perspective view of my improved rotary hoe.

In the practice of my invention I provide a frame in which is mounted a rotary device or member $a$, which in the construction shown is cylindrical in form, and said frame consists of an upright yoke-shaped member $b$ and a forwardly-directed supplemental yoke-shaped member $c$, and the ends of the side portions of said frame members $b$ and $c$ are connected, and passing therethrough is a shaft $d$, on which the rotary device or member $a$ is mounted. The frame member $c$ ranges from the frame member $b$ at an angle thereto preferably of about eighty degrees, and said frame member $c$ is provided with a handle $e$; but the exact form of these parts may be varied, as may also the position of one of the frame members with reference to the other.

The rotary member $a$ is provided with longitudinal blades $f$, any desired number of which may be employed, but eight of which are shown in the drawing, and these blades in the form of construction shown are sunk into longitudinal grooves or recesses $g$, formed in said rotary member, and in the form of construction shown the grooves or recesses $g$ are approximately Y-shaped in cross-section. The blades $f$ are held in position in the form of construction shown by wire cords or similar devices $h$, which are passed around the rotary member $a$, adjacent to the opposite ends thereof, and through said blades, and this construction is such in the form of construction shown as to allow the blades $f$ to oscillate slightly in the grooves or recesses $g$. I also in practice provide the cross-head part of the frame member $b$ with an upright pin $i$, on which are placed weights $j$, any desired number of which may be employed and the object of which is to add to the weight of the device and force the blades $f$ into the ground as the implement is drawn thereover.

In practice this device is used in the manner of a hand-roller; but the operation thereof is similar to that of a hoe, the ground being divided and broken up and stirred by the blades $f$, and in this manner the ground may be kept in good condition and weeds and other foul growth destroyed.

My invention is not limited to any particular form of the blades $f$ nor to any particular means for securing the same to the rotary member $a$, and changes in and modifications of the construction shown may be made without departing from the spirit of my invention or sacrificing its advantages.

Having fully described my invention, what I claim as new, and desire to secure by Letters Patent, is—

In a device of the class described, a frame, a rotary member mounted therein and provided in the face thereof with longitudinally-arranged grooves, and blades loosely mounted in said grooves and capable of slight oscillatory movement, substantially as shown and described.

In testimony that I claim the foregoing as my invention I have signed my name, in presence of the subscribing witnesses, this 6th day of January, 1906.

MICHAEL SCHILLING.

Witnesses:
NOBLE HEATH,
HENRY SENGSTACKEN.